United States Patent

Lantz et al.

[11] Patent Number: 5,886,896
[45] Date of Patent: Mar. 23, 1999

[54] METHOD AND APPARATUS FOR INTEGRATED CONTROL OF A SENSOR IN A MANUFACTURING PROCESSING STATION

[75] Inventors: Mikkel Lantz, Santa Clara; John T. Shea, Sunnyvale, both of Calif.

[73] Assignee: Advanced Micro Devices, Inc., Sunnyvale, Calif.

[21] Appl. No.: 752,665

[22] Filed: Nov. 19, 1996

[51] Int. Cl.$^6$ ........................................... G06F 19/00
[52] U.S. Cl. ............................ 364/468.23; 364/468.22; 364/468.28
[58] Field of Search ........... 364/468.02, 468.15–468.18, 364/468.22, 468.23, 468.28, 474.16, 474.17, 474.19, 551.01, 551.02

[56] References Cited

U.S. PATENT DOCUMENTS

| | | | |
|---|---|---|---|
| 4,930,086 | 5/1990 | Fukasawa | 364/468.23 |
| 5,121,331 | 6/1992 | Lovrenich | 364/468.23 |
| 5,411,358 | 5/1995 | Garric et al. | 414/940 |
| 5,432,702 | 7/1995 | Barnett | 364/468.28 |
| 5,508,934 | 4/1996 | Moslehi et al. | 364/468.28 |

*Primary Examiner*—Paul P. Gordon
*Assistant Examiner*—Steven R. Garland

[57] ABSTRACT

A method and apparatus for manufacturing products is provided with a computer that controls a processing tool, and a sensor that senses an operating condition of the processing tool. The sensor is coupled to the computer so that the setup and operation of the sensor is controlled by the computer. The control of the sensor and the processing tool by the computer is performed according to a single recipe, thereby providing automatic setup of the sensor in addition to the processing tool. Information from the sensor gathered during the processing step is integrated into the database coupled to the computer to provide correlation between the sensor data and lot and entity records related to the products being manufactured by the processing tool.

8 Claims, 2 Drawing Sheets

METHOD AND APPARATUS FOR INTEGRATED CONTROL OF A SENSOR IN A MANUFACTURING PROCESSING STATION

BACKGROUND OF THE INVENTION

1. Technological Field Of The Invention

The present invention relates to the field of manufacturing products, such as semiconductor chips, and more particularly, to a method and apparatus for controlling a manufacturing process and sensing parameters related to that process.

2. Description Of Related Art

The manufacture of most products, such as wafers containing semiconductor devices, requires a number of discrete processing steps to create the product. For the example of wafers, a number of discrete steps are needed to produce a packaged semiconductor circuit device from raw semiconductor material. The starting substrate is usually a slice of single crystal silicon referred to as a wafer. Circuits of a particular type are fabricated together in batches of wafers called "lots" or "runs". The fabrication process creates regular arrays of a circuit on the wafers of a lot. During processing, the individual wafers in a lot may go through individual processing steps one at a time or as a batch. At the completion of wafer processing the wafers are tested to determine circuit functionality. Later the wafers are sliced, the functioning products are packaged, and further testing occurs prior to use by the customer.

Data gathered during the course of wafer processing is used to diagnose yield problems and forms the basis of yield improvement efforts. For example, during semiconductor processing, particle contamination in the processing tool will normally have a deleterious effect on product yield. In order to collect data on particle contamination, a sensor may be used that senses the level of particle contamination in the processing tool chamber, in the outflow gas, or other area.

In known arrangements, the in situ sensor for measuring a parameter or operating condition, such as particle contamination, is controlled independently of the processing tool. This sensor also has its own separate database for storing the sensor data that is collected during the manufacturing processing step performed by the processing tool. The processing tool is controlled by a computer, separate from the sensor controller, and has its own database which stores information that identifies the lot that is being processed and the processing tool. This information, known as the lot and entity record, may also contain certain data such as when the processing began, ended, etc.

One of the problems with this known arrangement is the extreme difficulty in correlating the specific lot with the particle measuring data that has been sensed and stored by the sensor. This may occur, for example, since the time stamp of the computer controlling the processing tool is often not synchronized with the time stamp for the database associated with the sensor. It then becomes a painstaking process for a person to manually correlate the sensor data with the lot data. The expense involved in correlating the sensor data with the lot data may be greater than the value of the information that can be gleaned from the correlated data.

Another disadvantage of the known system is the independence of the sensor control and sensor data from the computer that operates the processing tool. Since the computer receives no information regarding, for example, particle contamination during the manufacturing processing step, changing the operation of the processing tool or halting the operation altogether if the particle contamination is too high may not be performed until only after a number of lots have been processed and the defects determined.

SUMMARY OF THE INVENTION

There is therefore a need for a method and an apparatus for integrating the control of a sensor and the collection of data with a computer that controls the operation of a processing tool.

This and other needs are met by the present invention which provides an arrangement for manufacturing semiconductor devices comprising: a processing tool for performing at least one manufacturing process step on the semiconductor devices, a sensor which senses a condition of the manufacturing process step; a computer that controls the manufacturing process of the processing tool according to a set of process instructions, and a memory that stores and associates identification data, which identifies the semiconductor devices on which the manufacturing process step is performed by the processing tool, with sensor data sensed by the sensor during the manufacturing processing step performed on the semiconductor devices.

The needs are also met by another embodiment of the present invention which provides a method of manufacturing a product using a processing tool, comprising the steps of: storing in a memory identification information that identifies products to be processed by the processing tool, operating the processing tool to perform a manufacturing process step on the products, sensing a manufacturing process condition during the manufacturing process step, and storing the sensed manufacturing process condition in the same memory as the identification information such that the sensed manufacturing process condition is correlated to the identification information.

One of the advantages of the present invention is the automatic correlation of data from the sensor with the lot and entity record information. This automatic correlation saves a great deal of effort and expense in attempting to manually correlate sensor data with the lot and entity records for processed wafers. The correlated data may then be used by process engineers to improve the process and increase the product yield.

Another distinct advantage of the present invention is the ability to set up a control value of the sensor so that the computer can stop the process performed by the processing tool automatically if the data from the sensor indicates this to be the proper course of action. This prevents lots from continuing being processed with a high degree of contamination. This leads to an overall improvement in the economics of production.

A further advantage of the present invention is the automation of the sensor setup such that a human operator is no longer needed to configure the sensor for each lot or group of lots. Rather, since a single recipe controls not only the process tool, but also the set up of the sensor, a separate recipe for the sensor does not have to be provided as input to the sensor controller. Hence, the present invention provides for increased automation of the manufacturing process, leading to a reduction in manufacturing costs.

The foregoing and other features, aspects and advantages of the present invention will become more apparent from the following detailed description of the present invention when taken in conjunction with the accompanying drawings.

DETAILED DESCRIPTION OF AN ILLUSTRATIVE EMBODIMENT

The present invention will be described in the context of the manufacture of semiconductor devices. This is exemplary only, however, as the method of the invention is applicable to the manufacture of other types of products produced by one or more processing steps, using an automatically controlled processing tool.

Figure 1:
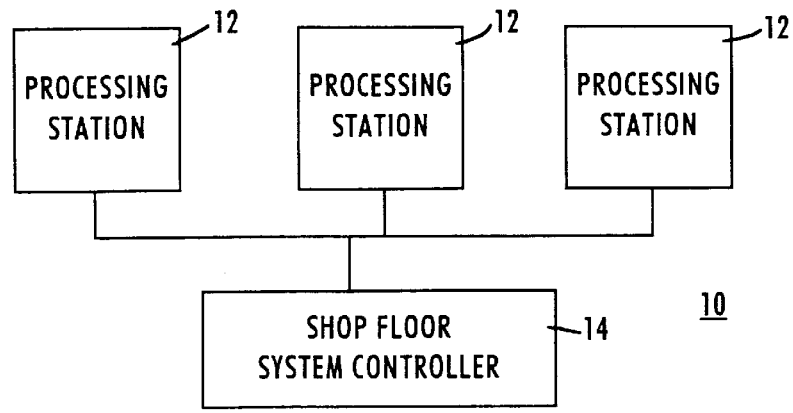
FIG. 1 is a block diagram of a manufacturing arrangement with a plurality of processing stations constructed in accordance with an embodiment of the present invention.

FIG. 1 is a block diagram of a processing arrangement constructed in accordance with an embodiment of the present invention. The processing arrangement 10 has a plurality of processing stations 12 that perform different steps of a manufacturing process. A shop floor system controller 14 communicates with the processing stations 12 to control the overall manufacturing processing of the wafers.

Figure 2:
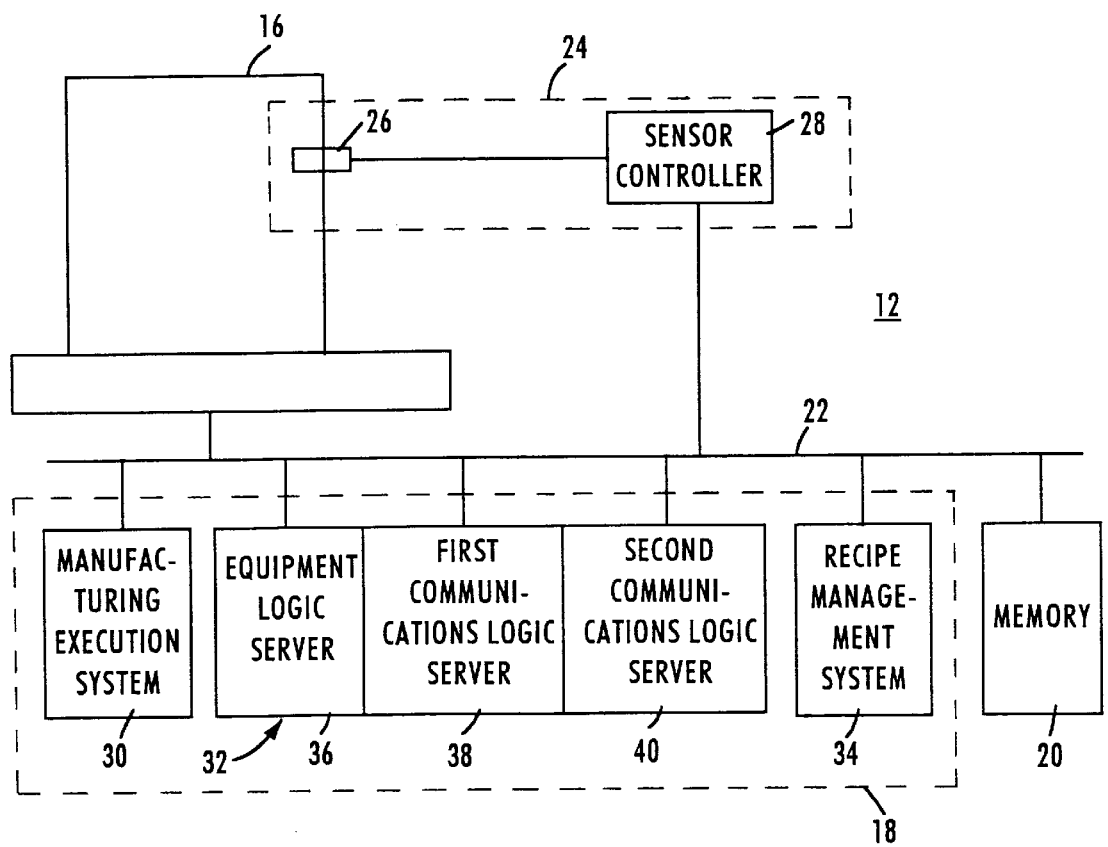
FIG. 2 is a block diagram of a single processing station of FIG. 1 constructed in accordance with an embodiment of the present invention.

A single processing station 12 is depicted in block diagram form in FIG. 2. This exemplary embodiment of the processing station 12 includes a processing tool 16 that performs at least one manufacturing process step of the manufacturing process on a product, such as a wafer. An example of a processing tool 16 is a deposition tool, such as that manufactured by Novellus of San Jose, Calif. or the P5000 deposition tool manufactured by Applied Materials of California, or an etch tool such as the LAM Rainbow Etch or the Applied Materials etching tool. Although these processing tools are given as examples, the present invention is applicable to any processing tool in which an in situ sensor may be applied.

The processing tool 16 receives wafers, either from an entry point to the manufacturing process, or from another processing station. Under the control of a computer 18, the processing tool 16 performs one or more manufacturing processing steps on the wafer. The computer 18 is a conventional computer that communicates with the processing tool 16 using the Semiconductor Equipment Communication Standard (SECS) 1, 2, that is an industry standard for communicating with processing tools. This communication standard essentially comprises software that controls and gathers data from the processing tool 16 itself. A separate computer 18 may be provided for each processing station 12, or a single computer serving as the shop floor system controller 14 may act as the computer 18 for each of the different processing stations 12.

In operation, a plurality of wafers, such as 24 wafers, are moved into the processing tool 16. At the same time, an operator will enter identification data into the computer 18 which stores this data (lot and entity data) into a memory (or database) 20. The communications between the computer 18 and the memory 20 is carried over a communications bus 22.

The computer 18 has a number of functional blocks that are implemented in software in the exemplary embodiment. These functional blocks are a management execution system 30, an equipment interface 32, and a recipe management system 34. An example of a manufacturing execution system is Workstream, manufactured by Consilium of Mountain View, Calif. In short, the manufacturing execution system 30 is a database application to control the information flow of the manufacturing process. It also controls access to the memory 20.

The equipment interface 32 communicates with the recipe management system 34 and the manufacturing execution system 30. The equipment interface receives "context information" from the workstream 30 and forms a message to send to the recipe management system 34. Context information is that information which uniquely identifies the process that is going to occur at that step in the operation, such as lot number, entity, product, route, etc.

The recipe management system produces a "recipe" based on the message provided by the equipment interface 32. The recipe is essentially the process instructions, such as the pressure, temperature, gas flow, etc. for that product in that step. The recipe is provided to the equipment interface 32 which then sets up the processing tool 16 and passes on the recipe to the processing tool 16. The processing tool 16 performs the manufacturing process steps in accordance with the set up and the recipe. Some data collection is performed by the processing tool 16, such as reports on when the processing began, ended, etc. This information is sent back to the manufacturing execution system 30 and stored in the lot and entity record in the memory 20.

In the present invention, the equipment interface 32 has three logical sections. An equipment logic server 36 primarily communicates with the manufacturing execution system 30. A first communications logic server 38 primarily communicates with a sensor 26, as will be described, and a second communications logic server 40 primarily communicates with the processing tool 16.

Equipment interfaces that include an equipment logic server and a single communications logic server are well known. For example, an equipment interface such as the configurable equipment interface originally produced by Thesis, of Richardson, Tex. and further developed by AMD as an equipment interface, is known. Another example of a suitable equipment interface is that sold as Graphiq by Fastek of Scotts Valley, Calif. The present invention, however, provides an equipment interface with a second communications logic server dedicated to communicating with the in situ sensor 26, as will be described in more detail below. The recipe management system is in the exemplary embodiment a known product made by Consilium of Mountain View, Calif.

In order to provide the particle data to determine particle contamination during the manufacturing process at a processing station 12, a sensor arrangement 24 is provided in situ. A suitable sensor is the HYT sensor, made by High Yield Technology, a division of Pacific Scientific of Sunnyvale, Calif. However, the typical HYT sensor includes a sensor, a controller, a computer and a separate database. The independent control by the sensor computer and separate database as well as the storage of the data collected from the sensor by the separate computer and database of the conventional sensor arrangement is disadvantageous as discussed earlier. The separate nature of the sensor database from the database 20 in which the lot and entity record information is stored makes it difficult to correlate the particle contamination data with the lot and entity record data. Also, the sensor must be manually configured through the computer for the sensor by an operator, thereby increasing costs of manufacturing.

In order to overcome these and other problems, the present invention uses only a portion of a conventional sensor. The sensor arrangement 24 of the present invention thus employs only the sensor portion 26 that is situated in an area of the processing tool to sense particle contamination, and a controller 28 that controls operation of the sensor 26.

The controller 28 is coupled to the communication bus 22 to receive instructions (via an RS232 line, for example) as well as provide the sensor data to the communications bus 22 which can then be stored in the database memory 20.

The controller 28 of the sensor arrangement 24, in the present invention, is controlled through the computer 18 based upon a recipe in the recipe management system 34. Sensor data gathered by the sensor arrangement 24 is provided to the database memory 20 so that correlation of the particle data with the lot and entity record is performed automatically. The arrangement of the present invention also has the advantage of allowing for a feedback control of the processing tool 16 according to limit values that may be set for a particular process. Thus, if the sensor arrangement 24 senses a particle contamination above a certain limit, when this sensor data reaches the computer 18, the manufacturing execution system 30 is able to cause a shutdown of the processing tool 16 to prevent further lots from being processed and wasted.

In exemplary embodiments of the invention, the recipe stored in the recipe management system 34 for a lot is a "dual recipe" that comprises the conventional recipe provided to the processing tool 16, and a recipe for setting up the sensor arrangement 24. The recipe for the sensor arrangement 24 will contain information as to what size particles to look for, what type of data collection to perform, when to trigger the sensor on and off, the intervals based on the time parameters, setting the clock on the sensor, etc. The recipe for the processing tool 16 and the recipe for the sensor arrangement 24 are linked in the recipe management system 34 to form a single recipe. The linking of recipes in a recipe management system 34 is well known, but has not previously been used to link a sensor controller recipe with that of a processing tool. Hence, from a single recipe comprising a dual link recipe, the present invention provides for controlling of the processing tool 16 and an in situ sensor arrangement 24.

Figure 3:
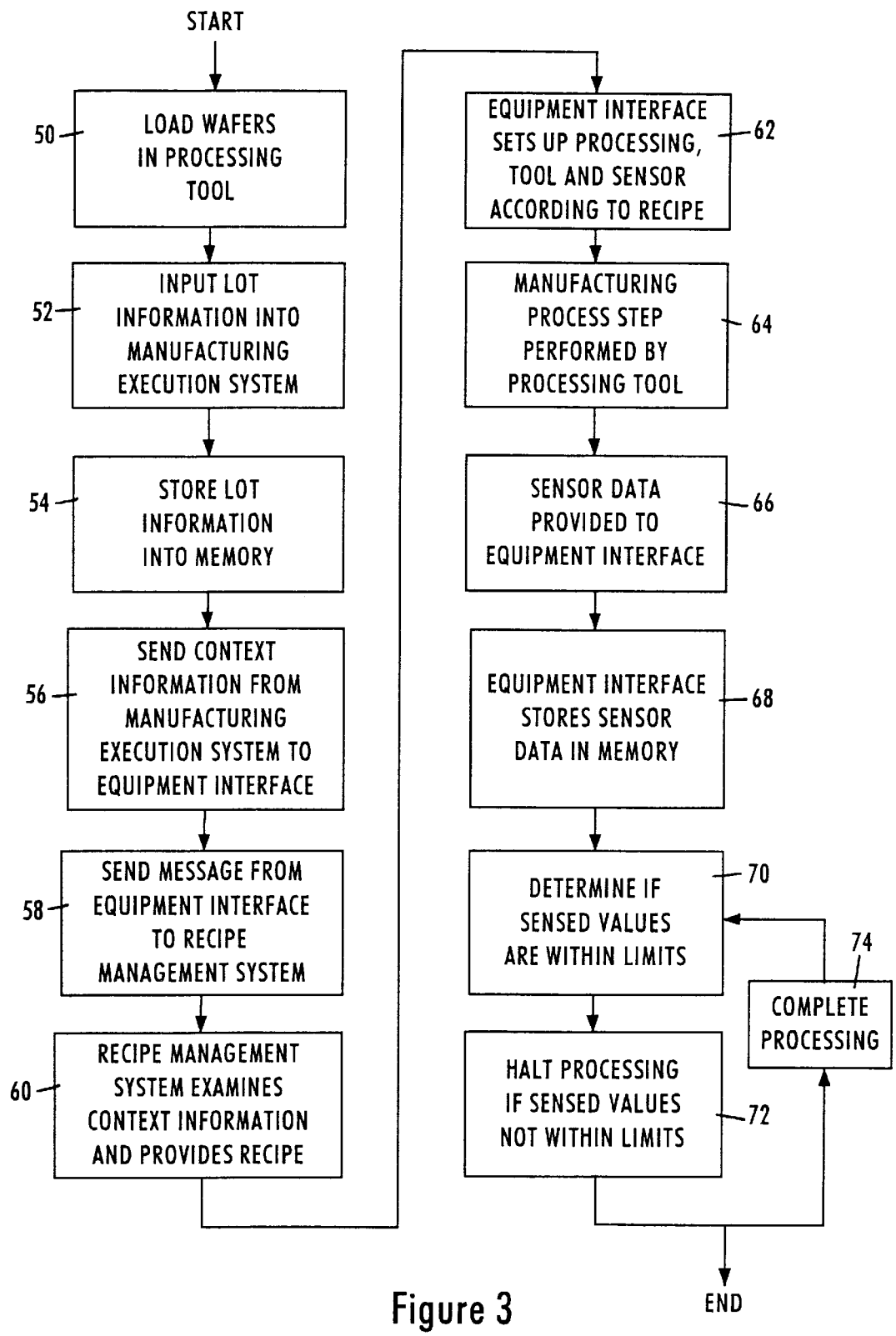
FIG. 3 is a flow chart of a method for controlling a processing tool in accordance with an embodiment of the present invention.

An embodiment of the method of operation of the present invention is depicted as a flow chart in FIG. 3. In step 50, a number of wafers are loaded into the processing tool 16. At the same time, the information identifying that lot is entered into the manufacturing execution system 30 by an operator at the processing station 12 in step 52. The information is stored in the database in memory 20 in step 54.

The manufacturing execution system 30, based on the information that was input in step 52, provides context information to the equipment interface 32 in step 56. This context information is specific for the individual processing tool 16. Context information is that information which uniquely identifies the process that is going to occur at that step in the operation, such as lot number, entity, product, route, etc.

In step 58, the equipment interface 32, and specifically the equipment logic server 36, uses this context information to form a message to send to the recipe management system 34 in step 58. The recipe management system 34, in step 60, examines the message and produces a single recipe comprising a dual linked recipe for controlling both the processing tool 16 and the sensor arrangement 24. This recipe is provided back to the equipment interface 32.

In step 62, one of the communication logic servers 40 provides the process instructions to the processing tool 16 based upon the recipe received from the recipe management system 34. The other communications logic server 38 provides instructions to the controller 28 of the sensor arrangement 24 to set up the sensor 26, also in accordance with the recipe received from the recipe management system 34.

Once the processing tool 16 and the sensor arrangement 24 are properly set up according to the dual linked recipe from the recipe management system 34, the manufacturing process step is then run by the processing tool 16. The sensor 26 gathers data during the manufacturing processing step, stores this data in the sensor controller 28, which provides its information to the equipment interface 32 in step 66. The equipment interface 32 knows what lot is being processed and provides the sensor information (the particle data, for example) incorporated into the lot and entity records of the database in the memory 20. This is performed in step 68.

In step 70, it is determined, during the manufacturing process, whether the sensor data indicates that the processing should be halted due to high particle contamination or other sensed condition. If the sensed condition is within the limits values set up in the recipe, the processing continues (step 74). However, if the sensed values are not within the prescribed limits, the process is either halted in step 72 or an operator is informed.

Although the present invention has been described with the example of a particle contamination sensor, the invention is applicable to other types of in situ sensors, such as temperature, pressure, etc.

The use of dual recipes and the coupling of the sensor arrangement directly to the computer and database that control the processing tool in accordance with the present invention provides a number of advantages, such as the use of a single recipe that controls not only the processing tool, but also the sensor. The invention also integrates the sensor data with the lot and entity data to provide for correlation between this data to allow process engineers to use the sensor data to increase product yield. Furthermore, the sensor information can be used in a feedback control of the processing tool in a more effective and automatic manner than in the past. This will prevent lots from continuing to be processed when conditions are outside of set values. This decreases the amount of waste that would otherwise occur. Also, the present invention with its automated sensor set up, represents a further step towards the automation of the entire manufacturing process, thereby decreasing the costs of manufacturing products such as semiconductor devices.

Although the present invention has been described and illustrated in detail, it is to be clearly understood that the same is by way of illustration and example only, and is not to be taken by way of limitation, the spirit and scope of the present invention being limited only by the terms of the appended claims.

What is claimed is:

1. An arrangement for manufacturing semiconductor devices, comprising:
   a processing tool for performing at least one manufacturing process step on the semiconductor devices;
   a sensor which senses a condition of the manufacturing process step;
   a computer that controls the manufacturing process of the processing tool according to a set of process instructions; and
   a memory that stores and associates identification data, which identifies the semiconductor devices on which the manufacturing process step is performed by the processing tool, with sensor data sensed by the sensor during the manufacturing processing step performed on the semiconductor devices;
   wherein the computer further includes a manufacturing execution system that sends control signals to the processing tool to control the processing tool, an equipment interface and a recipe management system communicatively coupled to each other and to the manufacturing execution system, the equipment interface including means for retrieving from the recipe management system a recipe for performing the manufacturing process step, and means for generating the set of process instructions in accordance with the recipe retrieved from the recipe management system.

2. The arrangement of claim 1, further comprising a sensor controller coupled to the sensor to control the sensor in accordance with sensor control instructions.

3. The arrangement of claim 2, wherein the equipment interface includes a first communications logic server that communicates with the sensor controller and provides the sensor control instructions in accordance with the recipe retrieved from the recipe management system.

4. The arrangement of claim 3, wherein the equipment interface includes a second communications logic server that communicates with the processing tool to provide the processing tool with the process instructions.

5. A method of manufacturing a product using a processing tool, comprising the steps of:

storing in a memory identification information that identifies products to be processed by the processing tool;

operating the processing tool to perform a manufacturing process step on the products;

sensing a manufacturing process condition during the manufacturing process step;

storing the sensed manufacturing process condition in the same memory as the identification information such that the sensed manufacturing process condition is correlated to the identification information retrieving a single recipe that is a function of the identification information;

setting up the sensor to operate in accordance with the recipe; and sending the recipe to the processing tool.

6. The method of claim 5, further comprising analyzing the sensed manufacturing process condition during operation of the processing tool and controlling the operation of the processing tool as a function of the sensed manufacturing process condition.

7. The method of claim 6, wherein the products are semiconductor wafers.

8. An arrangement for manufacturing semiconductor devices, comprising:

a processing tool for performing at least one manufacturing process step on the semiconductor devices;

a particle sensor which senses a condition of the manufacturing process step;

a computer that controls the manufacturing process of the processing tool according to a set of process instructions, said computer including means for controlling the processing tool as a function of the sensor data; and a memory that stores and associates identification data, which identifies the semiconductor devices on which the manufacturing process step is performed by the processing tool, with sensor data sensed by the sensor during the manufacturing processing step performed on the semiconductor devices.

* * * * *